United States Patent [19]
Tarter et al.

[11] Patent Number: 5,410,109
[45] Date of Patent: Apr. 25, 1995

[54] VEHICLE ON-BOARD WEIGHING SYSTEM AND METHOD

[76] Inventors: Ralph E. Tarter, 20308 Knollwood Dr., Saratoga, Calif. 95070; Timothy M. Gerstbauer, 16520 Shamrock Dr., Mishawaka, Ind. 46544

[21] Appl. No.: 50,666

[22] Filed: Apr. 22, 1993

[51] Int. Cl.⁶ ............................................ G01G 19/12
[52] U.S. Cl. ........................... 177/136; 364/567; 177/199
[58] Field of Search ............... 177/136, 137, 141, 199; 364/567

[56] References Cited

U.S. PATENT DOCUMENTS

| | | | |
|---|---|---|---|
| 4,728,922 | 3/1988 | Christen et al. | 177/136 X |
| 4,839,835 | 6/1989 | Hagenbuch | 177/136 X |
| 4,860,587 | 8/1989 | Keller | 73/774 |

Primary Examiner—George H. Miller, Jr.
Attorney, Agent, or Firm—Burns, Doane, Swecker & Mathis

[57] ABSTRACT

An apparatus and method is disclosed for a vehicle on-board weighing system. The system includes sensor housings which may be placed between elements of a load-bearing unit such as the axle and the spring assembly of trucks and tractor-trailers or between the frame and the air-ride housing assembly of vehicles so equipped. A sensor housing is preferably placed at each spring assembly of the vehicle. Each sensor housing contains a weight sensor in the form of a transducer. The electrical output signal of each of the transducers, which is proportional in amplitude to the weight-generated applied, is connected to a monitor module. Total weight of the vehicle load as well as weight distribution of each axle may be indicated by a display on the monitor module. The monitor module contains an eprom that stores information of unsprung weight, installation weight-force, and tare weight of the vehicle. It may also store data from one or more previous readings. The monitor module contains a microprocessor that calculates the weight distribution and total weight in response to a keypad input query. The keypad is used for manual interrogation of system performance as well as for manual inputs of system characteristics. The monitor module may also be interrogated by, and send data and readings of weight and other information to, a remote monitor.

12 Claims, 5 Drawing Sheets

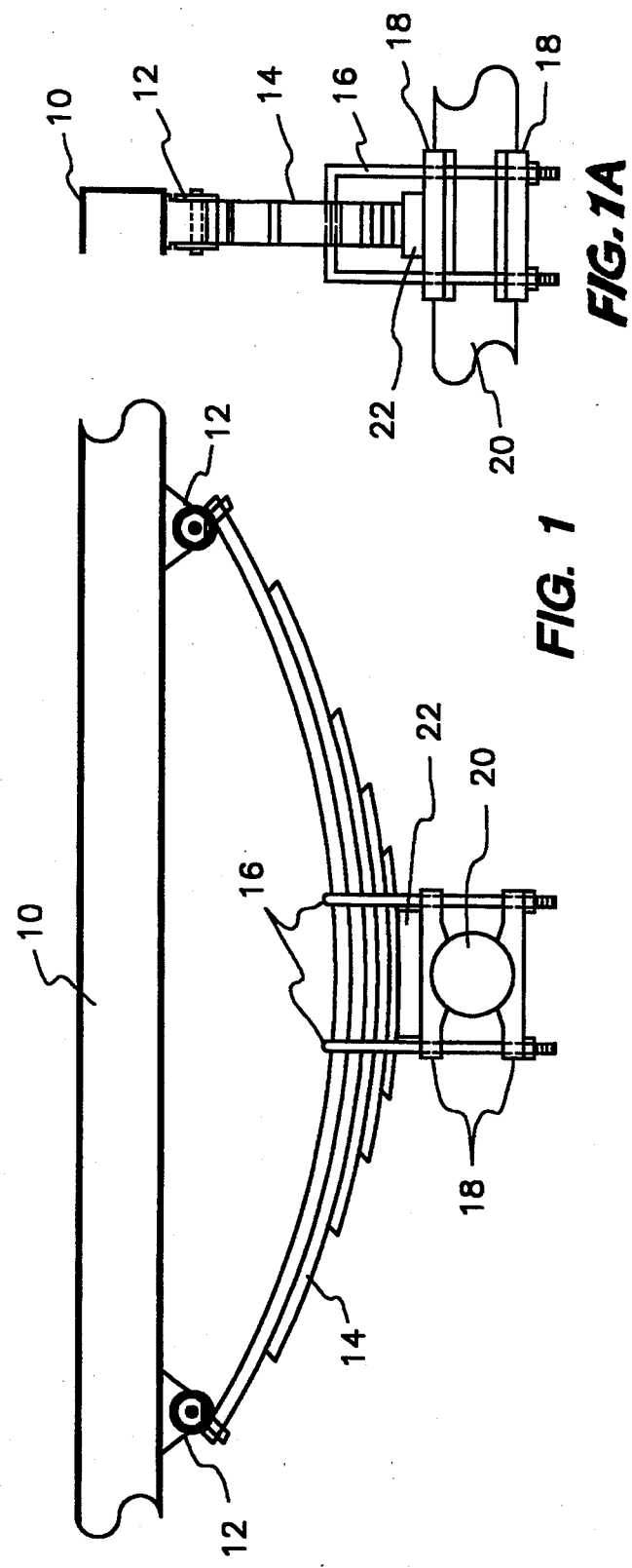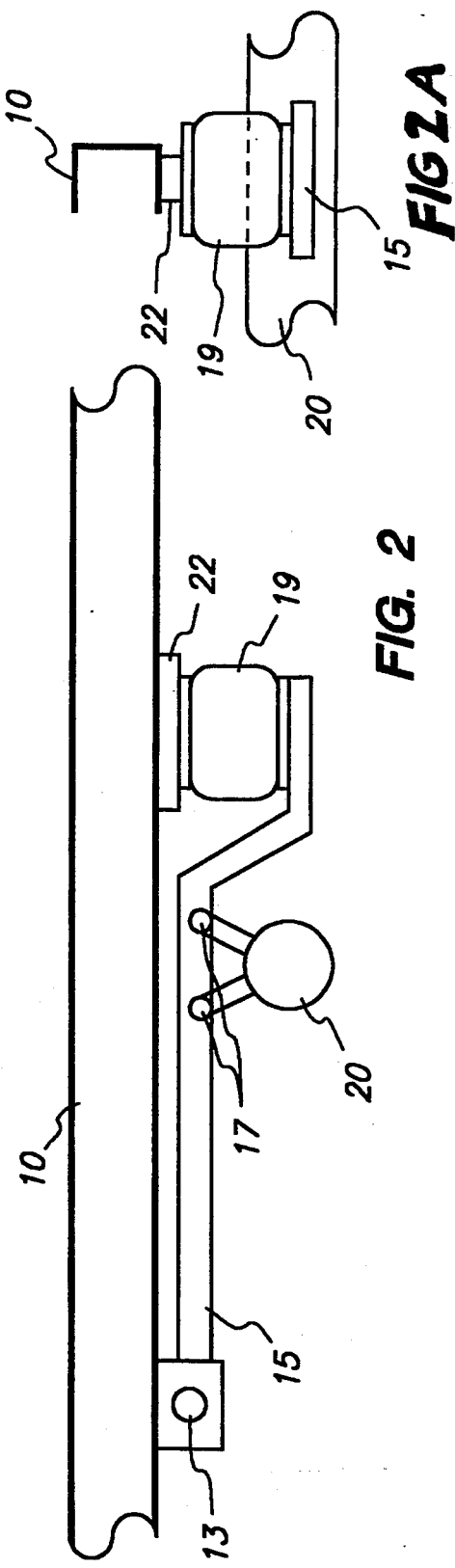

VEHICLE ON-BOARD WEIGHING SYSTEM AND METHOD

FIELD OF THE INVENTION

The invention relates to an apparatus and method for a vehicle on-board weighing system. Vehicle weighing systems commonly used are incorporated in scales built flush with a road surface. The weight of the entire vehicle is measured by such systems.

Some systems, exemplified by U.S. Pat. No. 5,076,375, entitled "Load Cell" and issued Dec. 31, 1991, use a rocker pin, guided beam torsion ring or other counterforce on which a load to be weighed is applied. That patent discloses the production of digital representations of loads applied to the counterforce using strain gages, and arrangements for translating those representations into weight information. The disclosure appears applicable to road surface scales over which the vehicle is driven. All of the weighing mechanism and displays or readouts of such scales are external to the vehicle.

U.S. Pat. No. 5,111,897, entitled, "Bridge Weighing-Motion System" and issued May 12, 1992, uses strain gages attached to existing girders of an existing roadway bridge. Analog strain signals are generated in response to the strain on the girders occurring when a vehicle passes over the bridge. The signals are amplified and converted into digital format. Axle sensors installed in or on the pavement before the bridge sense each vehicle axle passing thereover and generate analog axle sense signals which are also converted into digital format. The converted strain signals and axle sense signals are processed by a central processing unit to determine the vehicle speed and axle spacings, relate the position of every axle on the bridge to the strain signals record, and calculate the axle weights.

Other prior art patents such as U.S. Pat. No. 4,887,470, entitled, "Wire Bond Force Calibration Meter" and issued Dec. 19, 1989, disclose force sensing to determine the value of an applied force in applications unrelated to vehicle weight determinations. That patent incorporates its force calibration meter in a wire bonding machine.

The particular field of the invention herein disclosed and claimed is that wherein the net load and/or the gross weight of a vehicle may be initially determined and then redetermined whenever the vehicle load is changed due to the addition or removal of cargo comprising the total load. The vehicle is not required, or even expected, to be at a weigh-in terminal to make the determination. The determination is made on board the vehicle, and requires no outside roadway or other weight-sensing installation. Each determination is stored until another determination is made. When desired, the invention permits the last determined load, or a series of different determined loads, to be interrogated from outside the vehicle and transmitted to an information center near the vehicle. This can be done, for example, in another vehicle or in a base installation similar in function to current commonly-known weigh stations operated by governmental authorities and private enterprises.

BACKGROUND OF THE INVENTION

The availability of weight-measuring data of a vehicle and the load carried by the vehicle is important to many operators and fleet owners of vehicles. The standard method of measuring the weight of a vehicle such as a truck is by ground-imbedded weight scales such as those located at highway stations, which are manned by regulatory personnel. The fleet owner may also have such a weight scale at his primary depot, or may use publicly accessible private enterprise scales.

Prior and present vehicle weight-measuring art typically uses load cells as the weight-measuring element in a vehicle weight-measuring assembly. This method requires a substantial volume for the assembly and in some cases, the height required by the assembly would increase the vehicle height to an intolerable level. This is one reason such elements have not been successfully incorporated in the vehicles whose weights are to be measured, but may be used in roadway installations.

Another method involves the measurement of pressure in the air-bags of vehicles equipped with compressed air supported suspensions, as in air-ride. This method has poor accuracy for weight measurement, since it is dependent on the overall vehicle air pressure, and is adversely affected by temperature and altitude changes.

SUMMARY OF THE INVENTION

In accordance with the invention, an on-board vehicle weighing system allows on-board indication of total vehicle weight and the weight distribution on each axle of the vehicle. In a modified aspect of the invention it allows on-board indication of the net load weight being carried by the vehicle, and the net load weight distribution on each axle of the vehicle. The vehicle is typically a truck or a tractor-trailer combination. However, the invention may be embodied on automobile or bus suspension systems, aircraft landing gear, fork-lift hydraulics, batch/bulk haulers used in process control, railway cars, or on any vehicle, while in both static and dynamic vehicle conditions, in which it is desired that the weight of the vehicle, the weight carried by the vehicle, and the weight distribution on the wheels of the vehicle, or any of them, be indicated, observed and stored for informative, distributive, or regulative purposes.

The invention relates to apparatus and method for measuring or indicating the weight of cargo being loaded onto or being off-loaded from a vehicle, or being carried by a vehicle as a real-time event. This capability is important in many ways and for many advantageous reasons, some of which are discussed below.

The operator or the shipper can maximize the load for highest operating or hauling efficiency as it is being loaded onto the vehicle. He can also become aware of the unused weight allowance available to him without exceeding weight limits. This is especially true of trucks owned and operated by moving van companies and freight-hauling trucks subject to being loaded and unloaded in several stages with different cargoes possibly having widely varying densities.

The operator knows that the weight is within the regulatory limits of the vehicle as it travels in one or more jurisdictions. This is important when various heavy objects are loaded from and unloaded at several locations, all to be transported a long distance or over roads having vehicle weight limitations. This knowledge helps eliminate costly fines and delays that may take place if the vehicle is heavier than the imposed limits, and is always available without having to drive the vehicle to weight scales. This saves operating costs including wear and tear, fuel, crew time, etc., as well as making the entire operation more efficient.

The operator can determine the weight distribution on each axle or wheel set of the vehicle as well as the total vehicle weight. This can be important for cargo aircraft as well as truck vehicles. Determination can be made exclusive of the vehicle tare weight, thus providing actual load weight, or inclusive of the vehicle tare weight so as to provide total weight information at each axle or tire or for the total vehicle. This information may lead to savings on tire replacement costs with consequent savings. It can be extremely important for safety purposes.

In one embodiment of the invention, the system includes a weight sensor located in a housing that can be placed between the axle and the leaf-spring assembly of a truck or between other load-bearing members of a vehicle, such as between the frame (or chassis) and the air-ride suspension housing. The basic function of the weight sensor is to provide an electrical signal that is proportional to the mechanical weight applied to the sensor housing.

The weight sensing element may be embodied in the form of strain gages, pressure transducers, piezoresistive elements, piezoelectric elements, or magnetoresistive elements. These forms each have different specific characteristics, and one of the forms is likely to be found more applicable and desirable than another is, depending upon different particular vehicle characteristics and the typical road conditions normally encountered by the vehicle.

The weight sensing element may also be embodied in the form of displacement measurement, utilizing a Hal-effect device or utilizing a silicon photo diode and photo detector. In this latter means, a displaced member physically passes between the diode and the detector and the displacement is proportional to the weight applied. The reduction in the amount of light reaching the detector produces an electrical signal that is processed to correlate with the weight applied.

The weight sensing element can be connected to an amplifier, internal to the sensor housing, for analog signal processing and noise immunization of the analog signal prior to connection to the outside environment. Alternately, this analog signal can be connected to an analog-to-digital converter (ADC), internal to the sensor housing, for digital signal processing in serial-bit form prior to connection to the outside environment. This output signal can be connected to one or more monitor modules, conveniently located on the vehicle, in the cab of the vehicle, or at any location that can be observed by the operator of the vehicle. The monitor module (or modules if more than one is employed) provides a display of the vehicle weight parameters. Power to the weight sensor is typically provided by the vehicle main battery or by a back-up battery within the sensor housing. The weight sensor is preferably compensated for temperature changes and altitude ranges encountered in highway and off-road travel, and is designed to withstand the vibration and shock loads of these road conditions. The sensor housing and connector assembly is designed to withstand these same conditions as well as climatic conditions of rain, dust, and snow.

The weight monitor module contains digital electronics that process the data signals received from the weight sensors and provide a visual indication of vehicle weight parameters. An eprom stores information of unsprung weight, force or weight introduced by sensor housing installation, and tare weight of the vehicle. A microprocessor and associated software calculates the weight distribution and total weight of the vehicle in response to a keypad inquiry. A multi-button keypad is preferably located on the monitor module and is used within the vehicle for manual interrogation of system performance as well as for manual inputs of system characteristics. The readout display is located on the monitor module and may be an alpha-numeric liquid crystal display (LCD) by way of example. In more sophisticated arrangements, the readout display may be graphical as well as alpha-numeric. To one of ordinary skill in the art, the monitor module functions and operates as a typical modern data acquisition and readout system.

A further embodiment of the invention is a telemetry system, consisting of a transmitter internal to the sensor housing and an external receiver. The transmitter can operate in, above, or below the FM band or in pulse code modulation (PCM). It transmits the weight information of the vehicle to the external receiver. The telemetry is the communication link between the transmitted signal of each of the on-board weight sensors and the receiver, which indicates the weight parameters to the operator. In this manner, the number of cabling lines and connections to the sensor housing can be minimized.

A further embodiment of the invention is a telemetry system that can interface and access the master vehicle weight data transmitter with receivers operated by law-enforcement agencies for regulatory purposes and-/or by the vehicle fleet company. These receivers can be stationary, similar to truck-weighing stations, or can be mobile. In a mobile environment, the operator of a law-enforcement vehicle or a fleet owner survey vehicle can obtain weight information from a nearby stationary or moving vehicle or truck via a scanner that is a part of the receiver.

Transmission of the data from the master vehicle data transmitter may be in response to coded query signals, or may be continuous so that any receiver in range and direction of the broadcast may receive the data. To one of ordinary skill in the art, this embodiment is akin to that of acquiring vehicle speed information by radar.

This embodiment has the further advantages of eliminating weight stations, decreasing the tax-supported manpower and capital associated with the weight stations, and eliminating the truck operators' lost weigh-in time at regulatory or at public weight scales.

BRIEF DESCRIPTION OF THE DRAWINGS

FIG. 1 is a side elevation view of a portion of a vehicle and illustrates the basic installation of the invention on a truck equipped with a leaf-spring suspension in accordance with the invention.

FIG. 1a is an end view of the portion of the vehicle taken in the direction of arrows 1a—1a of FIG. 1.

FIG. 2 is a side elevation view of a portion of a vehicle and illustrates the basic installation of the invention on a truck or trailer equipped with an air-ride suspension.

FIG. 2a is an end view of the portion of the vehicle taken in the direction of arrows 2a—2a of FIG. 2.

DETAILED DESCRIPTION OF PREFERRED EMBODIMENTS

Figure 3:
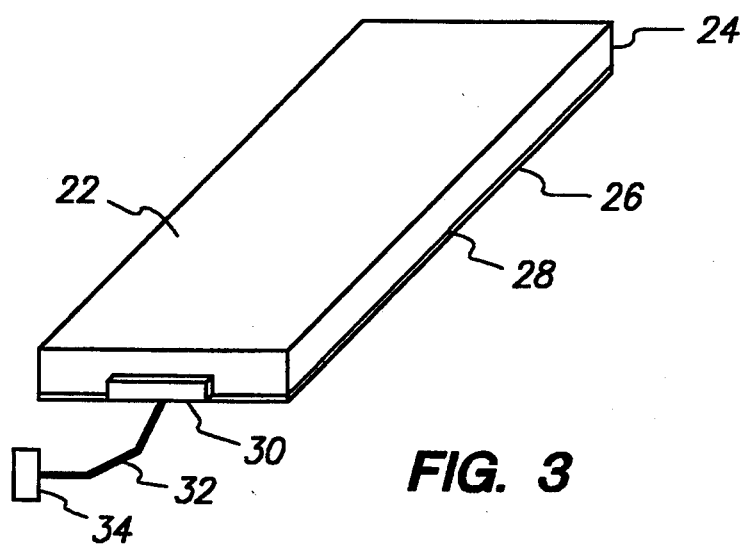
FIG. 3 illustrates the invention sensor housing and cover with connector and cable for interfacing.

A weight sensor housing module 22 utilizing the invention herein disclosed and claimed is shown in FIGS. 1 and 1a installed between a leaf-spring assembly 14 and an axle saddle 18, which is attached to axle 20. Axle 20 is understood to be a part of a vehicle V, such as a truck. U-bolts 16 hold the assembly of axle 20, axle saddles 18, weight sensor housing 22, and leaf-spring assembly 14 securely together. Bracket hanger support assembly 12 fastens the leaf-spring assembly 14 to frame 10 of the vehicle V. The height of weight sensor housing 22 is minimized to reduce the overall height of the vehicle frame 10 with respect to ground level.

A weight sensor module 22 according to the invention herein disclosed and claimed is shown in FIGS. 2 and 2a installed between the frame 10 of the vehicle and the air-ride assembly 19 of a trailing-arm suspension. Pivot assembly 13 is fastened to the frame 10 and supports trailing arm 15. Trailing arm 15 is attached to axle 20 by pivoting members 17. Air-ride assembly 19 is fastened between the sensor module 22 and trailing arm 15.

Weight sensor module 22 is shown in FIG. 3 and includes but is not limited to cavity or sensor housing 24, cover plate 26, seal element 28, connector 30, cable 32, and connector 34.

In each of FIGS. 4, 5, 6 and 7, the housing cover 26 has been removed so as to see inside the cavity 25 of the weight sensor housing. It is to be understood that the sensor housing of each of those figures uses a housing cover 26 such as that shown in FIG. 3.

Figure 4:
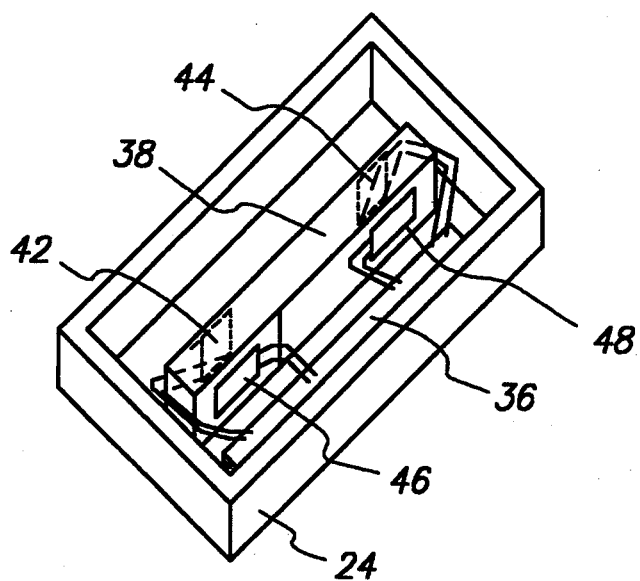
FIG. 4 illustrates the weight sensor elements of the invention, mounted on a load-bearing member within the housing, as strain gages that are connected to a circuit board.

FIG. 4 shows that cavity housing 24 contains a cavity or space 25 with four strain gages 42, 44, 46, and 48 mounted to a load-bearing member 38. Forces, which are products of the weight or load imposed on cover 26, are applied to member 38 via the cover 26. Strain gages 42 and 44 are in vertical strain and resistance decreases with applied load. Strain gages 46 and 48 are in horizontal strain and resistance increases with applied load. The electrical connections from strain gages 42-48 are made to circuit board 36. Circuit board 36 contains additional circuitry to process the electrical signals.

Figure 8:
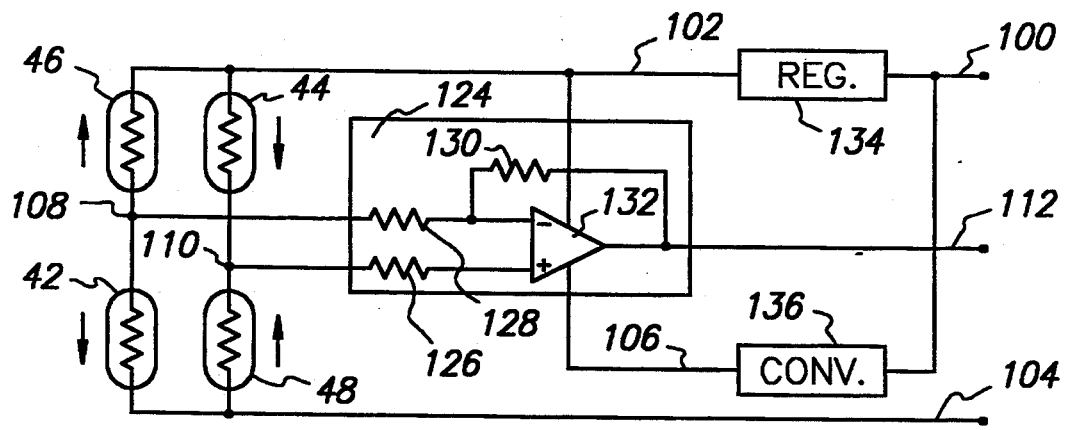
FIG. 8 is a schematic representation of the strain gages used in FIG. 4 plus an amplifier, regulator, and converter.

Referring to FIG. 8, which diagrammaticly shows the circuitry for the FIG. 4 disclosure, strain gages 42-48 form a Wheatstone bridge with voltages applied by lines 102 and 104. Lines 108 and 110, respectively connecting strain gages 42 and 46, and strain gages 44 and 48, are connected to amplifier 124. The voltages in lines 108 and 110 are applied to amplifier 124. Amplifier 124 includes resistors 126, 128 and 130, and operational amplifier 132. The positive output voltage of amplifier 124 at line 112 is proportional to the weight applied to the sensor housing cover and transmitted to the load bearing member 38. Resistor 128, connected with line 108, and resistor 126, connected with line 110, are input resistors to operational amplifier 132. Resistor 130 is a feedback resistor. The voltage gain of amplifier 124 is the value ratio of resistors 130/128 and the output of amplifier 124 as it appears at line 112.

Vehicle battery power (typically 12 or 24 volts) is introduced via connector 34, cable 32, and connector 30 of FIG. 3 to lines 100 (+12 or 24 volts) and 104 (return). All voltages are referenced to line 104, unless otherwise specified. Voltage regulator 134 provides a precise output voltage (typically +9 volts) at line 102. Dc-dc converter 136 provides a precise output voltage (typically −9 volts) at line 106, which is connected to operational amplifier 132. An operational amplifier 132 capable of operating from a single positive supply voltage would not require dc-dc converter 136. In that case, line 106 would be connected to line 104.

In response to a weight applied to load-bearing member 38 of FIG. 4, an axial strain is applied to strain gages 42-48. The axial strain equals the axial stress applied divided by Youngs Modulus of Elasticity, a constant. The axial stress equals the axial load applied divided by the cross sectional area of load-bearing member 38. The axial strain causes a slight increase in the resistance value of strain gages 46 and 48 and a slight decrease in the resistance value of strain gages 42 and 44, as indicated by the arrows of FIG. 8. This in turn decreases the voltage at line 108 and increases the voltage at line 110. The negative voltage potential between lines 108 and 110 is amplified and inverted by amplifier 124, providing a positive output voltage at line 112 that is proportional to the weight applied to load-bearing member 38.

Strain gages 42-48 are preferably of the Constantan type. Strain gages of this type inherently have a negligible temperature coefficient of resistance. In addition, the thermal coefficient of expansion of Constantan strain gages 42-48 is matched to the material of sensor housing 24, which is typically steel. With no weight applied, an output voltage null of zero volts at line 112 is accomplished by connecting a potentiometer in series with strain gage 42 or in series with strain gage 48 for a fine sensitivity adjustment. This null technique is well known to those skilled in the art.

Figure 5:
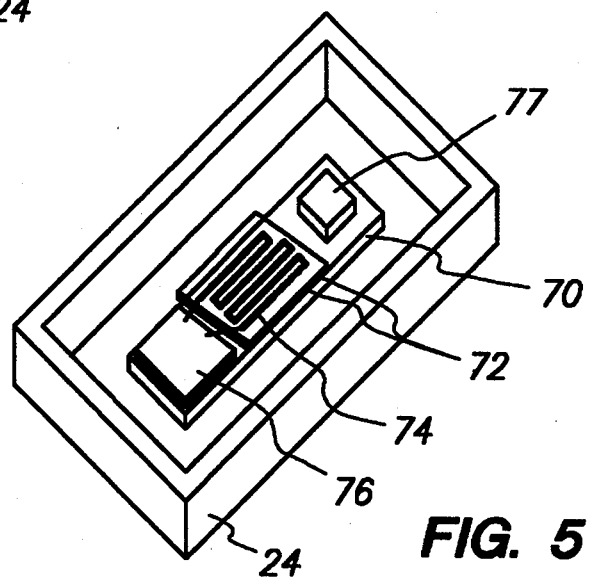
FIG. 5 illustrates a modification of the weight sensor element, mounted between a load-bearing member within the housing and the cover, the modified element being a piezoresistive element.

In the embodiment shown in FIG. 5, load-bearing member 70 has a pedestal on which piezoresistive element 74 is mounted between two layers of insulation material 72. Electrical connections from element 74 are made to circuit board 76, which has additional circuitry for signal processing. Force or weight is applied via cover 26 to element 74, which increases in resistance as force is applied.

Element 74 may be any of several piezoresistive devices. It may be a wire or foil layer of piezoresistive alloy. It may be comprised of conductive silver inks and resistive manganese disulfide inks that also provide a piezoresistive characteristic, albeit negative. It may be either ytterbium or an alloy of some of the elements copper, manganese, nickel and germanium. Several such alloys are well known to those skilled in the art of piezoresistive materials. An alloy of copper, nickel and germanium has been found to function satisfactorily, as has an alloy of copper, manganese and nickel. Any piezoresistive characteristic material used should change its electrical resistivity with applied forces applied in either a dynamic or a static condition. Different piezoresistive materials will change electrical resistivity at different rates, requiring appropriate amplification while maintaining stability even with high gain. While some change at relatively low rates, they may also have the advantage of being less affected by environmental variations. The choice of the particular piezoresistive characteristic material must consider environmental variations likely to be encountered, long term stability, cost, availability, and the level of electrical amplification and data signal processing required to obtain and accurately process the data, by way of example.

A feature of the invention shown in FIG. 5 is the provision of a mechanical stop 77. Stop 77 contacts cover 26 in modes of high vibration and shock to limit the force applied to element 74 to about 150 to 200 percent of the maximum rating of element 74. This same feature may also be incorporated in either of the arrangements shown in FIGS. 6 and 7.

Figure 9:
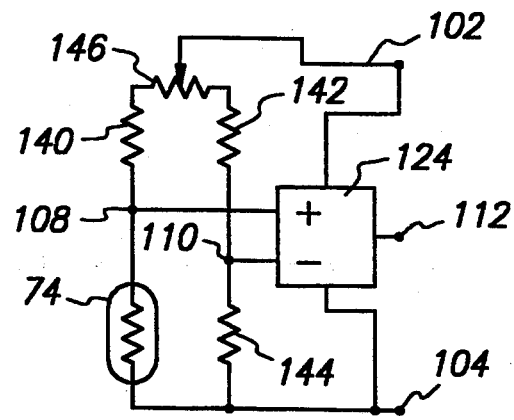
FIG. 9 is a schematic representation of the piezoresistive element used in FIG. 5 plus an amplifier.

FIG. 9 is a schematic representation of the circuit to measure weight-generated force using the arrangement of FIG. 5. Element 74 and resistors 140, 142, and 144 comprise a bridge connected between potentiometer 146 and line 104. With a force generated by vehicle weight applied to element 74, the resistance increase results in a voltage increase at line 108. Resistors 142 and 144 provide a fixed voltage at line 110. Lines 108 and 110 are connected to amplifier 124 whose output at line 112 is a positive voltage directly proportional to the force applied to element 74. With no weight applied, or only the tare weight applied if that weight is to be removed from consideration, an output voltage null is provided by adjusting potentiometer 146.

Figure 6:
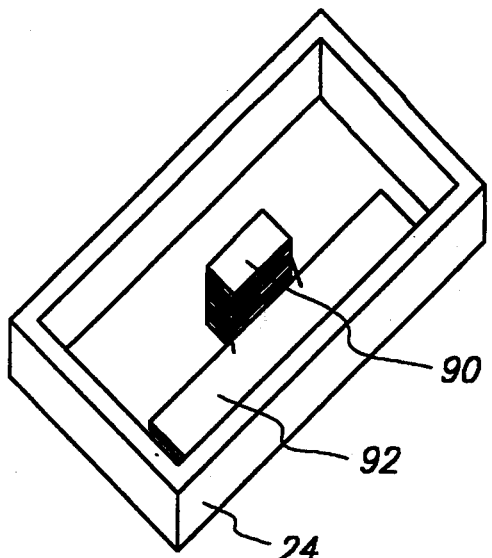
FIG. 6 illustrates another modification of the weight sensor element, mounted between a load-bearing member within the housing and the cover, the modified element being a piezoelectric element.

In the modification shown in FIG. 6, piezoelectric element 90 is mounted in cavity housing 24 and is in physical contact with cover 26 so that it also becomes the load-bearing member. Application of a weight-generated force on element 90 will produce a voltage at the electrical connections of element 90, which are connected to circuit board 92.

Figure 10:
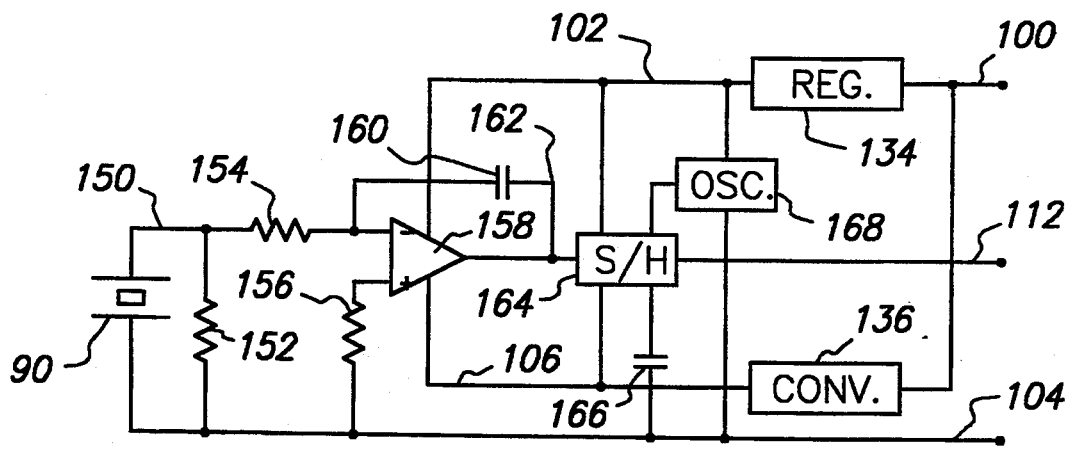
FIG. 10 is a schematic representation of the piezoelectric element used in FIG. 6 plus associated circuitry.

FIG. 10 is a schematic representation of the circuitry of circuit board 92. The circuitry measures weight-generated force using the arrangement of FIG. 6. Element 90 is connected to lines 150 and 104 and is connected across resistor 152, which serves as a voltage scaler. Resistors 154 and 156 serve as inputs to charge amplifier 158, with capacitor 160 as feedback. Thus element 90 produces a charge proportional to applied force and the charge is stored on capacitor 160. Line 162 connects amplifier 158 output to sample and hold (S/H) 164, which is controlled by oscillator 168. S/H 164 provides an analog output voltage at line 112 that is proportional to applied force. Regulator 134 and converter 136 provide precise power to amplifier 158, S/H 164, and oscillator 168.

Figure 7:
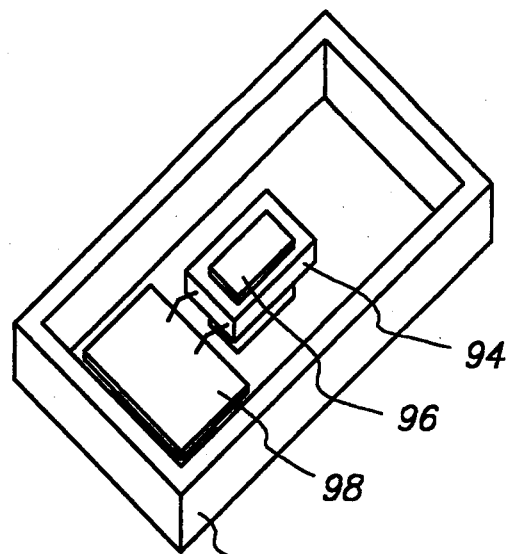
FIG. 7 illustrates still another modification of the weight sensor element, mounted between a load-bearing member within the housing and the cover, in which the modified element is a magnetoresistive element.

FIG. 7 illustrates still another modification embodying the invention. A magnetoresistive element 96 is mounted in cavity housing 24 and is in physical contact with cover 26. A weight-generated force applied to element 96 will cause a permeability change in that material. Coil winding 94 is placed in a magnetic path around element 96 and the described permeability change in material will produce a corresponding change in the inductance value of coil 94.

Figure 11:
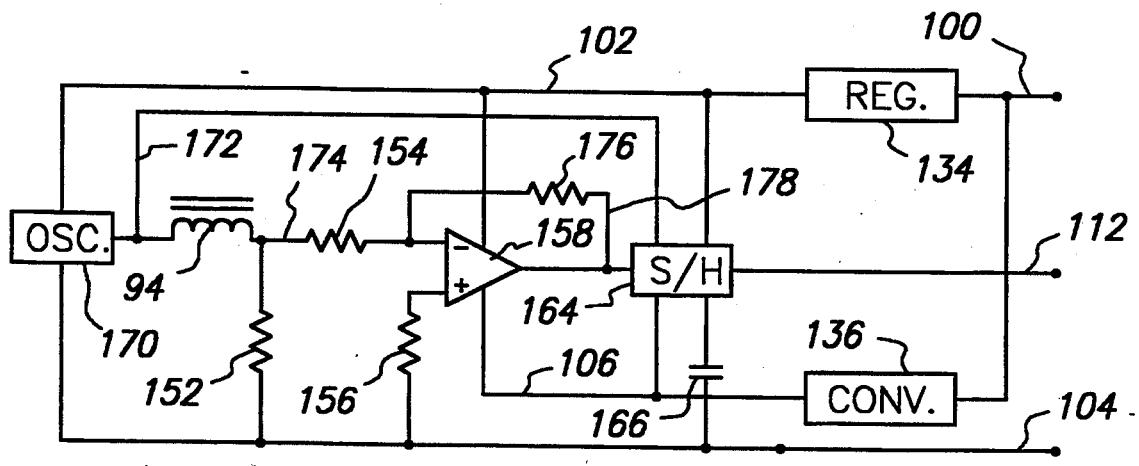
FIG. 11 is a schematic representation of the magnetoresistive element used in FIG. 7 plus associated circuitry.

FIG. 11 is a schematic representation of the circuit to measure weight-generated force using the arrangement of FIG. 7. Coil 94 is connected between oscillator 170 and resistor 152. The resulting signal at line 174 is an integrated voltage, whose amplitude is proportional to the time constant, L/R of inductor 94 and resistor 152. This voltage is applied to amplifier 158 via resistors 154 and 156. Resistor 176 establishes the gain of the circuit. Oscillator 170 controls S/H 164 via line 172. Again, the voltage output of S/H 164 is proportional to the weight or force applied to element 96.

Figure 12:
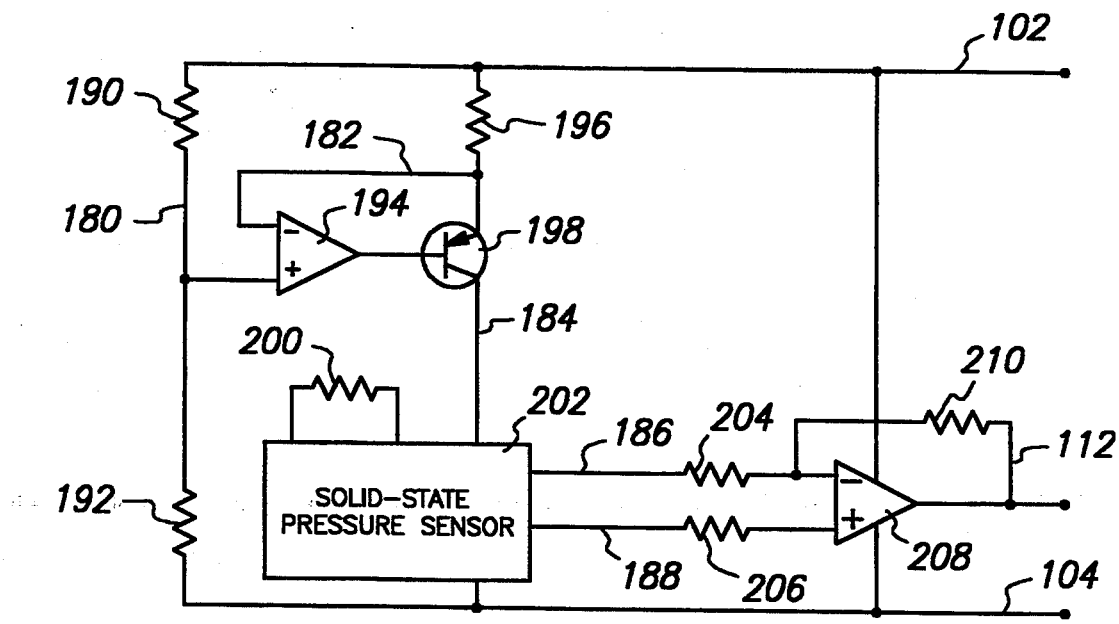
FIG. 12 is a schematic representation of a pressure transducer, mounted within the housing, and associated circuitry.

FIG. 12 schematically illustrates a pressure transducer mounted within the cavity housing, and associated electrical circuitry. Pressure sensor 202 produces an output voltage at lines 186 and 188 that is proportional to the pressure applied. The pressure sensor is shown as a solid-state device, which provides a more compact unit than conventional strain-gage pressure transducers or load cells. Units of pressure are typically in pounds per square inch (psi), kilograms per square centimeter (kg/cm$^2$), bar, or kilopascals (Kpa). The relationship of these different units are: 1 bar=1 kg/cm$^2$=14.5 psi=100 Kpa. Pressure sensor 202 is mounted in the cavity 25 of housing 24, which may be filled with a suitable fluid, liquid or gas. Obviously, housing 24 is sealed so that there is no leakage of fluid from cavity 25. Thus the force applied to the area of cover 26 produces a pressure within the cavity 25 that is applied to pressure sensor 202.

Again, a precise input voltage (typically 9 volts) is connected to lines 102 and 104. A constant current is supplied to sensor 202 by line 184 in the following manner. Resistors 190 and 192 produce a fixed voltage at line 180, which is an input to amplifier 194. The other input to amplifier 194 must be of equal value. Since the voltage across resistor 190 is constant, the voltage across resistor 196 must therefore be constant. Thus a constant current flows through resistor 196. Transistor 198 serves as a buffer connected to amplifier 194. The base current of transistor 198 is very small, compared to the collector current, and negligible error results in the current flowing in line 184. A constant current is chosen to power sensor 202 since the temperature coefficient is typically less with constant current than with constant voltage. Resistor 200 provides temperature compensation. Sensor 202 output voltage at lines 186 and 188 is connected to amplifier 208 by resistors 204 and 206.

Resistor 210 provides feedback and the overall gain of amplifier 208 is the resistive ratio of 210/204. The positive output voltage at line 112 is directly proportional to the force or weight applied to the sensor housing 24.

Figure 13:
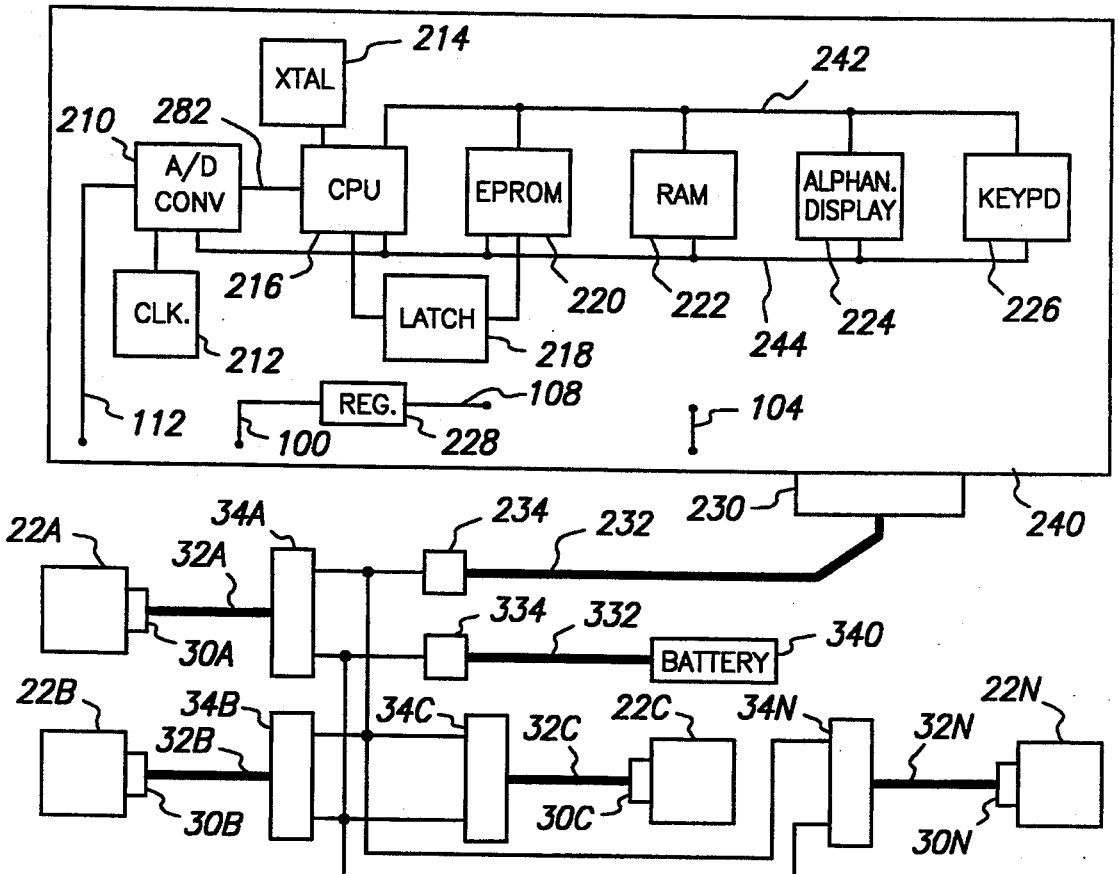
FIG. 13 is a diagrammatic representation of the components within the weight monitor module, together with cables and interfacing connectors to the sensor housings and to vehicle battery power.

Load sensor housing 24, connector 30, cable 32, and connector 34 of FIG. 3 are repeated in FIG. 13 with A, B, C, and N suffixes where A, B, and C represent sensors at three spring (leaf, coil, or air-ride) locations and N represents the Nth, or last spring location. In FIG. 13, connectors 34 interface with connector 234 and connector 334. Connector 334 connects to vehicle battery 340 via cable 332. Connector 234 connects to monitor module 240 via cable 232 and connector 230. In module 240, line 100 represents battery voltage, line 104 represents battery return, and line 112 represents an analog voltage proportional to weight applied to sensor housing 24, as these designations were common to other figures. The analog voltage on line 112 is applied to analog to digital (A/D) converter 218. The output of converter 218 at line 282 is applied to central processor unit (CPU) 216. Also, converter 218 is triggered by clock generator 212, and CPU 216 is triggered by crystal controller oscillator (XTAL) 214. Data are applied to various components by line 242, and line 244 controls the interface between the various components. Values of vehicle unsprung weight, tare weight, other pertinent data, and software are stored in EPROM 220. Random access memory (RAM) 222 holds the data until the vehicle operator inputs a query through keypad 226, at which time the proper information in response to specific query is shown on alphanumeric display 224. Latch 219 interfaces with CPU 216 and EPROM 220. It is understood by those skilled in the art that the techniques just described are common to microprocessor system operation.

Figure 14:
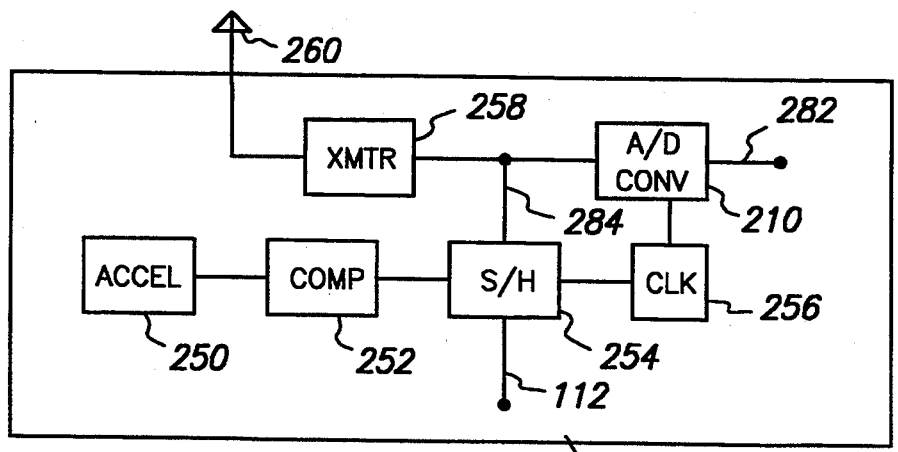
FIG. 14 is a diagrammatic representation of the weight monitor module with a feature to sample and hold data obtained in a static vehicle condition and includes a transmitter to broadcast the data of vehicle weight.

FIG. 14 shows an alternate method of obtaining weight data, which may purposely limit displayed information to the last static vehicle condition. In this case, accelerometer 250 senses vehicle motion and the output of accelerometer 250 is applied to comparator 252. The output of comparator 250 triggers sample and hold (S/H) 254, which is triggered by clock 256. The analog data on line 112 is the same as that of line 112 of FIG. 13 and module 240 is the same as that of FIG. 13.

When the vehicle is in a static condition, such as while being loaded or at rest (not moving along a roadway, for example), the signal from accelerometer 250 and comparator 252 is absent and the data on line 112, which is the same as line 112 of FIG. 13, is passed to line 284 and to the input of A/D converter 218, which is the same as FIG. 13 and is triggered by clock 256. When the vehicle is in motion, the signals from accelerometer 250 and comparator 252 cause S/H 254 to latch and the data at line 284 that is retained is the data that occurred under the last static condition. Thus the digital output at line 282 remains latched. This feature eliminates potential erratic display readings caused by vehicle vibration under moving or motion conditions. Therefore, the most currently available data is that obtained while the vehicle was last in a static condition. That condition may occur while the vehicle is stopped at a traffic light, in a rest area, or stopped for any other reason. It may occur during loading or unloading operations after loading or unloading each batch of cargo. It can be so set that it changes its load data each time that a container or a part or other part of a total load is added or removed.

The clock 256 may provide the time (and the date, if desired) that the weight data is obtained, and such time is also recorded with the weight data. Either the same clock, or a separate timer, may provide a momentary delay to assure that the vehicle has settled to a static weight condition before a new set of data is obtained. It is understood by those schooled in computer science that the described signal generation, signal processing and memorization functions are readily achieved during the last static vehicle condition.

Data for the previous reading, or for any number of previous readings, may be stored in memory and recalled upon command. Such data may include the data relating to vehicle unsprung weight, tare weight, etc. so that any changes in such input data are identifiable. While not shown, provision may be made to print out or otherwise display all or selected parts of memorized data either continuously or upon command.

FIG. 14 also shows module 240 with the data on line 284 applied to transmitter 258, which can operate in the FM band or other permissible radio band. The output of transmitter 258 is applied to antenna 260 for broadcast. Again, the data on line 284 and thus the broadcast signal from antenna 260 retains the data of the last or prior static condition, or the data obtained from each of several other occurrences of such condition. Transmitter 258 may be a transceiver, with the ability to receive a respond command, which may be a coded signal sent from an exterior transceiver. Upon receipt and recognition of the respond command, the transmitter part of the transceiver will then broadcast the stored data. A suitable time device may be a part of the system which permits only one cycle of broadcast stored data, or permits broadcasting for a defined period of time and then stops further transmission unless and until a new respond command is sent, received and recognized. While various forms of interrogation-response command operations are known and have been used for identification-friend or foe in military radar equipment, for example, applicants are not aware of the application of this concept in vehicle on-board weight measuring systems.

Figure 15:
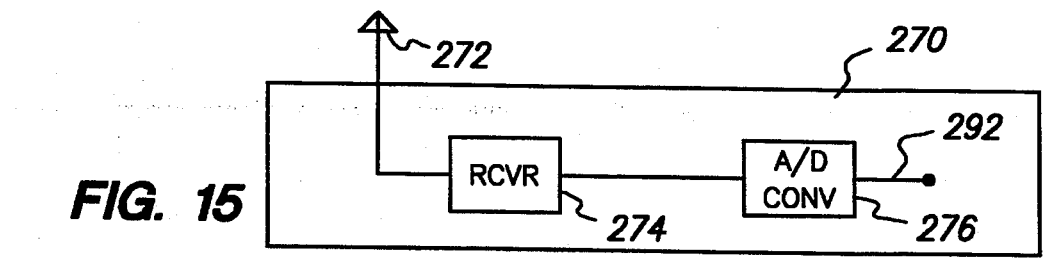
FIG. 15 is a diagrammatic representation of a remote module for receiving the broadcast data of vehicle weight and processing this data for display at a location remote to the vehicle being monitored.

FIG. 15 shows remote module 270, which contains receiver 274, A/D converter 276, and associated elements of local module 240 of FIG. 13. The output data at line 292 is the same as that at line 282 of FIG. 13 and is applied to a CPU similar to CPU 216 of FIG. 13. It is understood that remote modules 270 could be in the possession of law-enforcement personnel in a mobile environment or be stationary at one or more truck-weighing stations. Also, a remote module 270 could be located at the depot of the vehicle fleet owner or in a vehicle used by the fleet owner to selectively monitor fleet trucks. If the system on the vehicle is set to continuously broadcast stored data, receiver 274 need only be a receiver. If the system on the vehicle will transmit only when a proper respond command is received by it, then receiver 274 will be a transceiver capable of sending the respond command when activated, and receiving the stored data then transmitted.

In addition to weight information transmitted by the elements of FIG. 14, it is understood that transponder information such as vehicle (both tractor and trailer) registration and vehicle identification numbers (VIN) could be transmitted from the data stored in the memory elements of module 240. This feature allows law-enforcement personnel to identify the vehicle and the allowable vehicle weight, as well as the actual weight of the vehicle. This feature also allows the fleet owner to track the vehicle (a present practice, but not in this manner) with prelocated and/or mobile tracking stations, and also provides data of vehicle load versus vehicle capacity on a real-time basis. This allows the fleet owner to redirect the vehicle to alternate freight sites to maximize load-hauling capacity and the information on or location of these sites may not be known by the vehicle operator.

When the vehicle system is incorporated in a law-enforcement system for checking the weight of many vehicles, it may be desirable that the data stored in the memory elements relating to tare weight, unsprung weight, vehicle registration, vehicle identification numbers, etc., can be changed only by a law-enforcement agency representative so as to assure correct vehicle weight information received by the law-enforcement agency whenever the vehicle system is queried. The data may, for example, include the date of and authorization for the last change made to the data, and the data which existed before such change was made. The law-enforcement agency may then use this information in its computer system to verify that the data was changed with the authorization of the agency, if there is any question about the correctness of the data.

What is claimed is:

1. A vehicle on-board weight-measuring system comprising:
    a piezoresistive transducer/sensor assembly located at each suspension point of a vehicle to be weighed and positioned to receive and sense the portion of the vehicle weight applied thereto and generating output signals proportional to that applied weight;
    a memory circuit for receiving, storing and sending data;
    a central processing unit having circuitry for operatively performing computations based on signals from each of said transducer/sensor assemblies;
    means for entering unloaded vehicle weight data into said memory circuit;
    means for computing total vehicle weight as well as the weight at each individual transducer/sensor assembly location from said signals and said memory circuit entered data;
    an information-giving device for giving information to an information-receiving operator, said information-giving device interfacing with said central processing unit circuitry and with said memory circuit to give information indicating weight in at least one unit of weight measurement;
    and control means operable by an operator and interfacing with said central processing unit circuitry to command or query the system so that information relating to vehicle weight is given to the information-receiving operator by said information-giving device.

2. A vehicle on-board weight-measuring system comprising:
    a transducer/sensor assembly located at each suspension point of a vehicle of a predetermined type to be weighed, for sensing the portion of the vehicle weight applied thereto and generating output signals proportional to that applied weight, each transducer/sensor assembly occupying one of the following positions: a position between a spring and an axle of the vehicle if the vehicle is of a first predetermined type; a position between an air bag and a frame of the vehicle if the vehicle is of a second predetermined type; and a position between an air bag and a trailing arm of the vehicle if the vehicle is of a third predetermined type;
    a memory circuit for receiving, storing and sending data;
    a central processing unit having circuitry for operatively performing computations based on signals from each of said transducer/sensor assemblies;
    means for entering unloaded vehicle weight data into said memory circuit;
    means for computing total vehicle weight as well as the weight at each individual transducer/sensor assembly location from said signals and said memory circuit entered data;
    an information-giving device for giving information to an information receiving operator, said information-giving device interfacing with said central processing unit circuitry and with said memory circuit to give information indicating weight in at least one unit of weight measurement;
    and control means operable by an operator and interfacing with said central processing unit circuitry to command or query the system so that information relating to vehicle weight is given to the information-receiving operator by said information-giving device.

3. The system of claim 1 or claim 2 in which said transducer/sensor assembly output signals are analog signals, and further comprising:
    means for converting said analog signals to digital signals;
    and said memory circuit entered data being transmittable to said means for computing vehicle weight as digital signals.

4. The system of claim 1 or claim 2, wherein said transducer/sensor assembly further comprises:
    a housing including:
        a base providing a cavity with a load-bearing member positioned therein;
        a cover closing the housing and being in operative vehicle weight-transmitting force relationship to said load-bearing member and said base;
        a weight-sensing device mounted on said load-bearing member and adapted to generate signals reflecting the amount of weight being applied to said load-bearing member through said cover;
        an amplifier circuit that operatively amplifies the signals from said weight-sensing device;
        and an electrical circuit that applies electrical power from a power source to said amplifier circuit and to said weight-sensing device.

5. The apparatus of claim 4 wherein said weight-sensing device is also at least a part of said load-bearing member so as to have the weight being applied to said load-bearing member being at least in part transmitted through said weight-sensing device.

6. The apparatus of claim 4 wherein said signals from said weight-sensing device as delivered to said amplifier circuit are analog signals which are directly proportional to said weight applied to said transducer/sensor housing.

7. The apparatus of claim 4 wherein said weight sensing element includes a piezoresistive element;
    said piezoresistive element having the characteristic of a change in resistance directly proportional to force applied.

8. The apparatus of claim 7 wherein said piezoresistive element is comprised of a material selected from a group of materials consisting of:
 (a) ytterbium; (b) a combination of conductive silver inks and resistive manganese disulfide inks; and (c) an alloy of a plurality of the elements copper, manganese, nickel and germanium.

9. The apparatus of claim 8, said alloy of said group being an alloy of copper, manganese and nickel.

10. The apparatus of claim 8, said alloy of said group being an alloy of copper nickel and germanium.

11. A vehicle on-board weight-measuring system comprising:
 a piezoresistive transducer/sensor assembly located at each suspension point of a vehicle to be weighed and positioned to receive and sense the portion of the vehicle weight applied thereto and generating analog output signals proportional to that applied weight;
 means for converting said analog signals to digital signals;
 a memory circuit for receiving, storing and sending data;
 a central processing unit having circuitry for performing computations based on digital signals from each of said transducer/sensor assemblies;
 means for entering unloaded vehicle weight data into said memory circuit;
 means for computing total vehicle weight as well as the weight at each individual transducer/sensor assembly location from said digital signals and said memory circuit entered data;
 a visual display panel interfacing with said central processing unit circuitry and with said memory circuit to indicate weight in at least one unit of weight measurement;
 and a keyboard interfacing with said central processing unit circuitry to command or query the system so that information relating to vehicle weight is displayed on said visual display panel.

12. A vehicle on-board weight-measuring system comprising:
 a transducer/sensor assembly located at each suspension point of a vehicle of a predetermined type to be weighed, for sensing the portion of the vehicle weight applied thereto and generating output signals proportional to that applied weight, each transducer/sensor assembly occupying one of the following positions: a position between a spring and an axle of the vehicle if the vehicle is of a first predetermined type; a position between an air bag and a frame of the vehicle if the vehicle is of a second predetermined type; and a position between an air bag and a trailing arm of the vehicle if the vehicle is of a third predetermined type;
 means for converting said analog signals to digital signals;
 a memory circuit for receiving, storing and sending data;
 a central processing unit having circuitry for performing computations based on digital signals from each of said transducer/sensor assemblies;
 means for entering unloaded vehicle weight data into said memory circuit;
 means for computing total vehicle weight as well as the weight at each individual transducer/sensor assembly location from said digital signals and said memory circuit entered data;
 a visual display panel interfacing with said central processing unit circuitry and with said memory circuit to indicate weight in at least one unit of weight measurement;
 and a keyboard interfacing with said central processing unit circuitry to command or query the system so that information relating to vehicle weight is displayed on said visual display panel.

* * * * *